Figure 1:
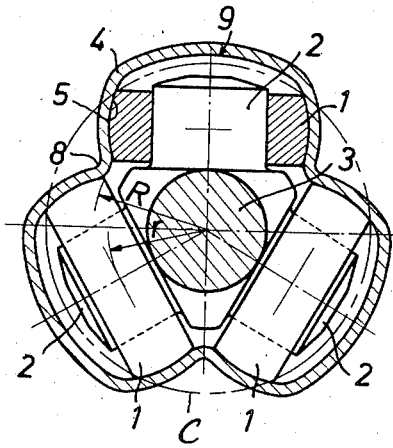

United States Patent [19]
Orain

[11] 3,792,596
[45] Feb. 19, 1974

[54] HIGH-CAPACITY HOMOKINETIC COUPLING

[75] Inventor: Michel Orain, Conflans-Sainte-Honorine, France

[73] Assignee: Societe Anonyme: Glaenzer Spicer, Poissy, France

[22] Filed: July 7, 1972

[21] Appl. No.: 269,572

[30] Foreign Application Priority Data
Jan. 25, 1972   France .............................. 72.02364

[52] U.S. Cl............................................ 64/21, 64/8
[51] Int. Cl............................................. F16d 3/30
[58] Field of Search 64/7, 8, 21, 32 R, 32 F, 27 NM

[56] References Cited
UNITED STATES PATENTS
| | | | |
|---|---|---|---|
| 2,386,754 | 10/1945 | Snyder | 64/8 |
| 3,381,497 | 5/1968 | Allen | 64/7 |
| 2,194,798 | 3/1940 | Koppel | 64/8 |

Primary Examiner—Benjamin W. Wyche
Assistant Examiner—Randall Heald
Attorney, Agent, or Firm—Baldwin, Wight & Brown

[57] ABSTRACT

A high-capacity coupling for the homokinetic transmission of rotary movement comprises a shell rigidly attached to a shaft or other transmission element. It defines three rectilinear rolling ways for part-spherical rollers which rotate and slide axially on respective axles carried by a transmission shaft. In transverse section the rectangles circumscribing the roller profiles intersect in pairs at their inner corners. The roller diameter and axial length and the distance of the centre of each roller from the axis of the coupling are so chosen that their product is maximal for a given diameter of the circumscribing the rollers and for a shaft resistance homogenous with that of the rolling bodies. This product is indicative of the capacity of the coupling.

8 Claims, 16 Drawing Figures

HIGH-CAPACITY HOMOKINETIC COUPLING

The present invention concerns a high-capacity homokinetic coupling of the type comprising three rollers of part-spherical profile turning on respective axles carried by a transmission shaft, the rollers being able to slide on the axles and to roll in respective rectilinear rolling ways formed in a shell rigidly connected to another transmission shaft, and whose transverse section is in the form of a clover leaf.

Various couplings of this variety have been described, and the present invention is intended to propose modifications able to confer the following advantages:

Reduced costs and investment for large-scale mass production;
Increased capacity for the same volume;
Improved sliding characteristics;
Increase in the limit angle of deflection;
Ease of fastening by flange or shaft, at will;
Provision for the incorporation of shock-absorbing pads.

In accordance with the present invention there is provided a high-capacity homokinetic coupling comprising a shell for rigid connection to a transmission element and defining three rectilinear rolling ways of part-circular profile in which roll and are axially retained three rollers of part-spherical profile mounted on respective axles carried by a transmission shaft, the rectangles circumscribing the rollers in a transverse plane intersecting in pairs at their inner corners, and the diameter, axial length and distance from the axis of the coupling of the centre of each roller are so chosen that their product indicative of the capacity of the coupling, is maximal for a given diameter of the circle circumscribing the rollers, and for a shaft resistance homogenous with that of the rolling bodies.

The shell may be attached directly to the end of a transmission shaft.

Alternatively, the shell may be disposed in a casing of homologous profile, rigidly connected to one transmission shaft, an elastomeric cushion being disposed between the shell and the casing.

The shell providing the rolling ways may be inserted in a plastics element during moulding of the latter.

The rolling ways may be formed directly in the cylindrical body of a pinion or coupling flange.

The rolling ways may otherwise be formed by elements inserted into a tubular body.

Figure 3:
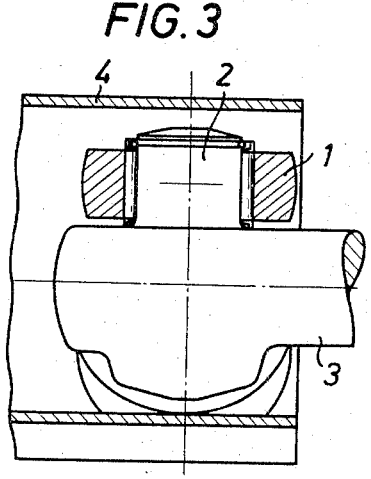
Figure 2:
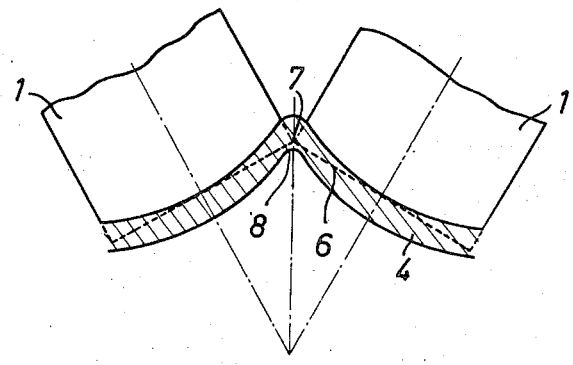
Figure 4:
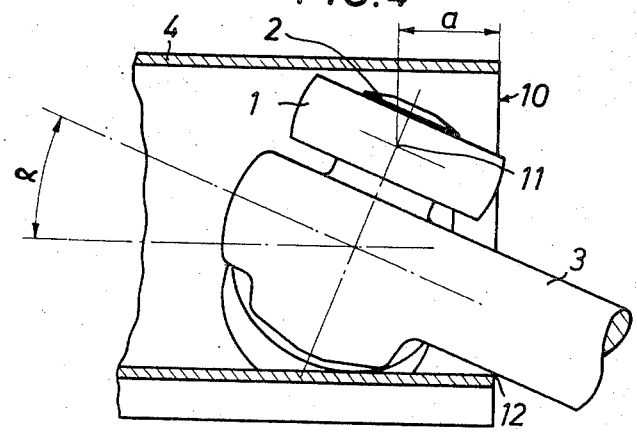
Figure 6:
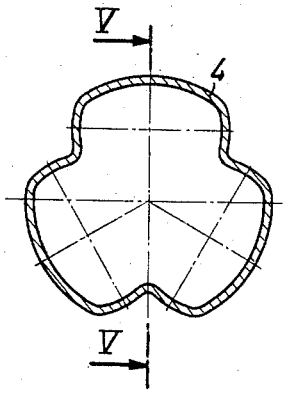
Figure 5:
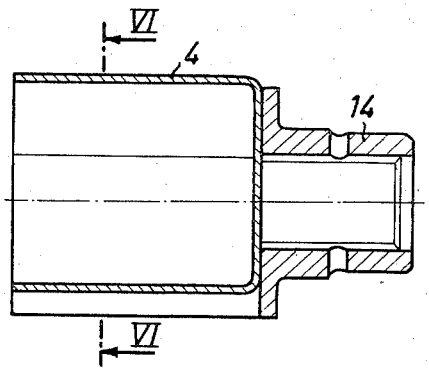
Figure 10:
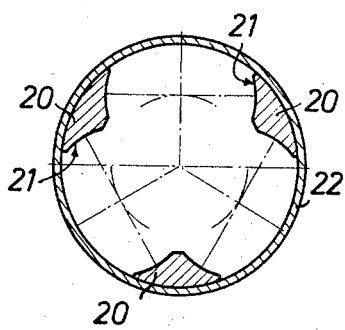
Figure 7:
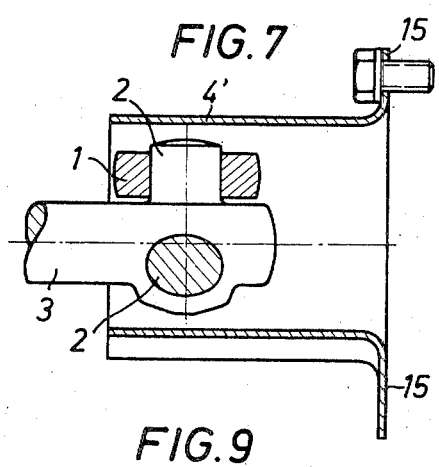
Figure 8:
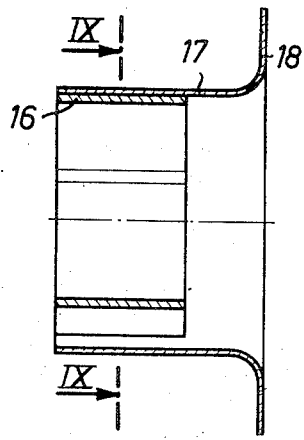
Figure 9:
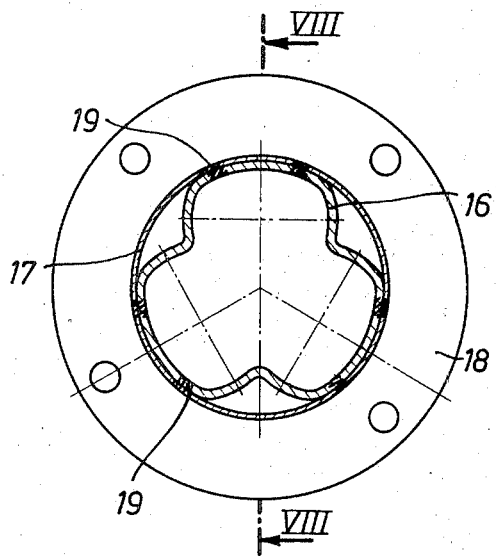
Figure 11:
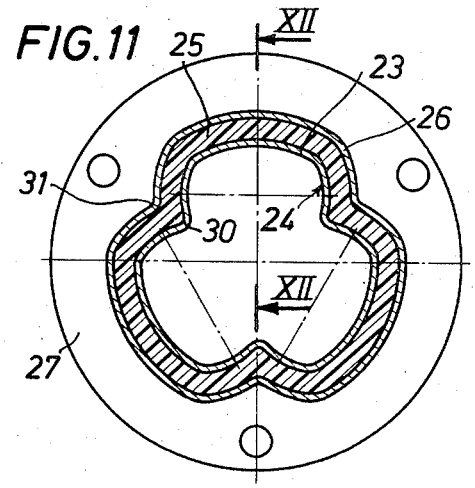
Figure 13:
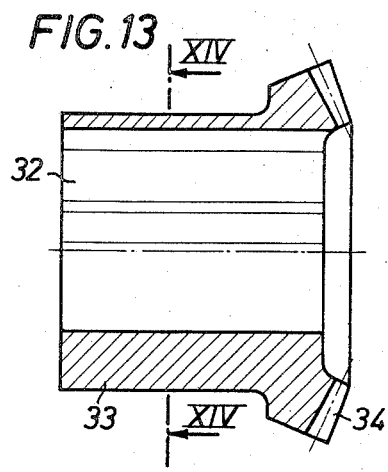
Figure 12:
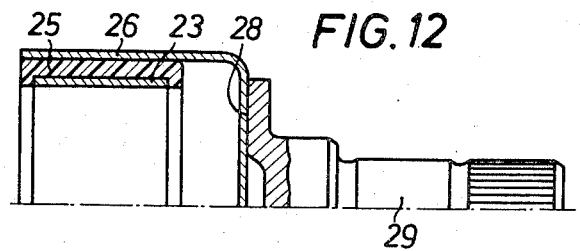
Figure 14:
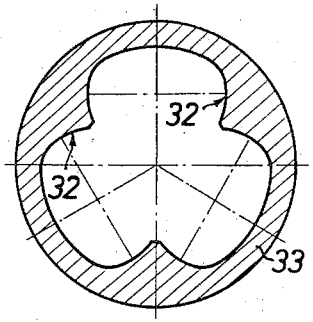
Figure 15:
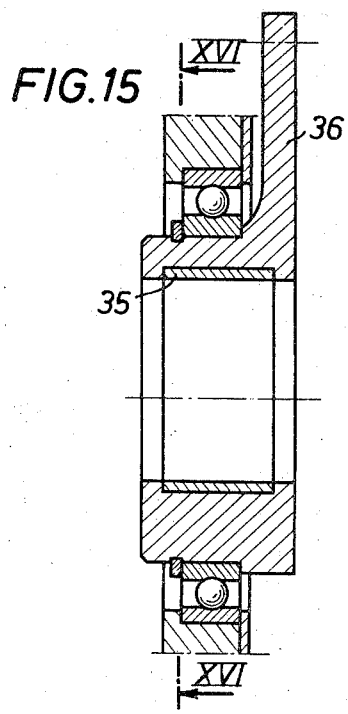
Figure 16:
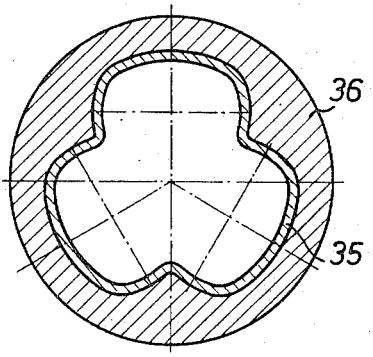

Various forms of coupling according to the invention are hereinafter described by way of non-limiting example only, with reference to the accompanying drawings, in which:

FIG. 1 shows one form of coupling;
FIG. 2 schematically shows a characteristic of the coupling;
FIG. 3 is a sectional profile view of the aligned coupling;
FIG. 4 shows another characteristic of the coupling;
FIG. 5 shows a method of attaching the shell to a shaft or other element, in section on the line V—V of FIG. 6;
FIG. 6 is a section on the line VI—VI in FIG. 5;
FIG. 7 shows another attachment method;
FIG. 8 shows another attachment method, in section on the line VIII—VIII in FIG. 9;
FIG. 9 is a section on the line IX—IX in FIG. 8;
FIG. 10 is a sectional view of another form of rolling way;
FIG. 11 is a section of a further form of coupling;
FIG. 12 is a section on the line XII—XII in FIG. 11;
FIG. 13 is a longitudinal section of a further form of rolling way;
FIG. 14 is a section on the line XIV—XIV in FIG. 13;
FIG. 15 shows another form of the rolling ways; and
FIG. 16 is a section on the line XVI—XVI in FIG. 15.

Referring to FIG. 1, the coupling includes three rollers which can rotate and slide axially on the respective axles 2 carried by a shaft 3 shown in an aligned position, that is to say with the axis of the shaft coincident with that of a shell 4 providing part-cylindrical rolling ways 5.

Referring to FIG. 2, the rectangles 6 which circumscribe the part-spherical roller profiles intersect in pairs at their inner corners 7.

Consequently the shell 4 has only one linking curve 8 between the adjacent rolling ways 5 for separate rollers, as is clearly seen in FIGS. 1 and 2.

The shell 4 preferably has a part-cylindrical wall 9 between the adjacent rolling ways 5 for the same roller.

In this coupling the radius $R$ of the rectangle which can be inscribed in the shell 4 is greater than the base radius $r$, the distance between the centre of a roller and the coupling axis. These radii are shown in FIG. 1. The possibility for sliding at a large relative angle is thereby improved, as shown in FIG. 4. For a given angle of inclination $\alpha$, sliding is limited by the distance $a$ between the edge of the rolling way 10 and the centre 11 of the cloest roller. This sliding distance $a$ is limited by contact at 12 between the radius R and the shaft 3, and will be increased as R increases. The rollers 1 are disposed entirely within a given diameter circumscribing circle C.

This coupling has the advantage of great ease of construction and consequently of reduced cost price.

The general form of the shell 4, approximately that of a cylinder, allows for economic production of the coupling from drawn or spun tube, or by folding a developed sheet, welding being acceptable along generatrices outside the rolling ways.

The precise internal dimensions of the rolling ways 6 may be obtained by light milling or by swaging.

The shell may also be formed by shaping a blank in the form of a cup obtained by stamping, such as that shown in FIGS. 5 and 6, with its base welded to a sleeve 14. It may also have the form shown in FIG. 7 in which the shell 4' is open and a portion 15 of the stamping blank is retained to provide a fixing flange. This form of construction permits easy milling for finishing the rolling ways.

FIGS. 8 and 9 show an embodiment in which the rolling ways 16 are disposed inside a tube 17 with a flange 18 and attached thereto by means of an adhesive or by spot welding.

FIG. 10 shows a further embodiment in which profiled strips 20 defining the rolling ways 21 are applied to the inside of a stamping 22.

FIG. 11 shows an embodiment in which the shell 23 with the rolling ways 24 is surrounded by an elastomeric cushion 25 in a casing 26 with a fixing flange 27.

FIG. 12 is a section showing a way of mounting this shell 23, the casing 26 having an end wall 28 to which a shaft 29 is attached by an adhesive or by welding.

The elastomer 25 is intended to absorb vibrations, oscillation and noise, by means of its resilience and energy dissipation capabilities. This form of mounting is particularly suitable for use with the invention.

Referring again to FIG. 11, the corners 30 prevent rotational sliding of the shell 23 under extreme transmitted torque relative to the casing 26 which has corners 31 on a profile similar to that of the shell. The elastomer may be attached to the shell and/or the casing.

Furthermore, the form of the casing 26 allows it to be radially wrought to pre-stress the elastomer and so improve its resistance to fatigue.

FIGS. 13 and 14 show an embodiment in which the rolling ways 32 are formed in the cylindrical hollow shaft 33 of a conical pinion 34. In this case the rolling ways are preferably finished by milling.

FIGS. 15 and 16 show an embodiment in which the shell 35 is encased in a plastics element 36 during moulding of the latter.

With this technique operational elements of varied types can be produced cheaply for the most diverse homokinetic coupling for transmission systems.

It should be noted that this form of coupling enables the shaft 3 and axles 2 to be formed as a single piece. The axles are of large diameter and small axial length. They are thus extrudable or swageable by a triple radial action. There is thus obtained a cheap and robust article of small volume, such as shown in FIGS. 1, 3 and 7. It will be appreciated that the axles could be integral with an element comprising a grooved bore engaging associated splines machined on the end of the shaft 3.

The invention is applicable to all transmission of rotary movement.

What is claimed is:

1. A high-capacity homokinetic coupling comprising:
    a shell defining three rectilinear rolling ways of part-circular profile;
    a transmission shaft within said shell;
    a set of three roller axles carried by said shaft; and
    a respective roller of part-spherical profile mounted on each of said shafts for rotation and axial sliding thereon;
    the arrangement of said elements being such that rectangles circumscribing said rollers intersect in pairs at their inner corners.

2. The coupling of claim 1 wherein the diameter and axial length of each of said rollers and the distance of the center thereof from the coupling axis are so chosen that their product is maximal for a given diameter of the circle circumscribing the three rollers, and a shaft resistance homogenous with that of the rolling bodies.

3. The coupling of claim 1 wherein adjacent part-circular rolling way profiles are connected by a single curved profile.

4. The coupling of claim 3 wherein said shell has a central axis, and the spacing of said curved profiles from said central axis is greater than the spacing of axial centers of said rollers from said axis.

5. The coupling of claim 1 wherein said shell has a central axis, and the spacing of said shell between adjacent ones of said ways from said central axis is greater than the spacing of axial centers of said rollers from said axis.

6. The coupling of claim 1 wherein said shell is in the form of a deformed metal tube.

7. The coupling of claim 1 wherein said shell is in the form of a cylindrical tube having secured to the interior thereof three way defining strips.

8. The coupling of claim 1 wherein said transmission shaft is of a triangular cross section at the point thereon from which said axles project with each axle projecting from a triangular side.

* * * * *